United States Patent

[11] 3,627,644

| [72] | Inventors | Hajime Okamoto;<br>Susumu Shoin; Saburo Koshimura, all of<br>Kanazawa-shi, Japan |
| --- | --- | --- |
| [21] | Appl. No. | 800,248 |
| [22] | Filed | Feb. 18, 1969 |
| [45] | Patented | Dec. 14, 1971 |
| [73] | Assignee | Hajime Okamoto<br>Kanazawa-shi, Japan |
| [32] | Priority | Mar. 1, 1968 |
| [33] | | Japan |
| [31] | | 43/13043 |

[54] PROCESS FOR THE CULTIVATION OF HEMOLYTIC STREPTOCOCCI
5 Claims, No Drawings

[52] U.S. Cl. .................................................. 195/96,
195/114, 424/493
[51] Int. Cl. ........................................ A61k 21/00,
C12d 1/20
[50] Field of Search .......................................... 195/66, 96,
66 B, 114, 30

[56] References Cited
UNITED STATES PATENTS
3,477,914  11/1969  Okamoto et al. ............. 195/96

Primary Examiner—Alvin E. Tanenhultz
Assistant Examiner—Robert M. Elliott
Attorney—Browdy and Neimark

ABSTRACT: A process for the cultivation of hemolytic streptococci by cultivating hemolytic streptococci (e.g., *Streptococcus hemolyticus* ATCC 21060) in a meat infusion broth or the medium containing an extract containing water-soluble components in a yeast autolysate as a major component of pH 7.0–7.5 containing oxaloacetic acid or salts thereof and, if desired, ribonucleic acid or ribonuclease core at about 37°C. for 14–20 hours, in order to obtain hemolytic streptococci having high streptolysin S producing ability as well as antitumor activity. An amount of the oxaloacetic acid or salts thereof is at least 0.2 percent by weight by volume of the medium when the yeast extract medium is used, and is 0.1 percent by weight by volume together with 0.5 percent by weight of ribonucleic acid when the meat infusion broth is used.

PROCESS FOR THE CULTIVATION OF HEMOLYTIC STREPTOCOCCI

The present invention relates to an improvement in the process for cultivating hemolytic streptococci. More particularly, the present invention relates to a process of cultivation for obtaining hemolytic streptococci having high producing ability of streptolysin S (abbreviated as SLS producing ability hereinafter) as well as high antitumor activity.

It has long been known that hemolytic streptococci, pathogenic bacteria of various diseases such as erysipelas, sepsis, puerperal fever and others, have antitumor activity and attempts have been made recently to treat the tumors with the hemolytic streptococci. However, besides the antitumor activity, the hemolytic streptococci produce hemolytic toxin and the pathogenicity and, therefore, the hemolytic streptococci can not be provided for the treatment of the tumors as such directly. A variety of treating methods have been investigated in order to remove these disorders. The most representative of these is, for example, the treating method with penicillin described in The Japanese Journal of Experimental Medicine, vol. 36, p. 161–174 (1966). The bacterial cells provided for the treatment should be those having antitumor activity and it is considered that the higher the antitumor activity of the bacterial cells is, the more effective the bacterial cells in the treatment of the tumors is.

Antitumor activity of the hemolytic streptococci has a close relation with the SLS, one of the hemolytic toxins produced by the hemolytic streptococci, producing ability, and it has been found that only the strains having SLS producing ability among the naturally occurring hemolytic streptococci have the antitumor activity and that the higher the SLS producing ability is, the higher the antitumor activity is. The SLS producing ability is employed as an index of the antitumor activity of the strains of the hemolytic streptococci.

For the cultivation of the hemolytic streptococci, particularly for the cultivation in order to provide for the treatment of tumors, a meat infusion broth or a medium containing an extract of water-soluble components in a yeast autolysate as a major component are conventionally employed.

An object of the present invention is to provide a process for the cultivation which provides the strains of the hemolytic streptococci with increased antitumor activity.

According to the present invention, the hemolytic streptococci having the antitumor activity are cultivated on a culture medium to which oxaloacetic acid or salts thereof are added.

The basic culture media employed are the natural or semisynthetic culture media. Meat infusion broth and yeast extract media are employed as the basic media. The meat infusion broths are disclosed in "Manual of Microbiological Methods" by the Society of American Bacteriologists, 1957, published by McGraw Hill Book Co.

The yeast extract media are prepared by dissolving, for example, commercial yeast extracts or yeast autolysate in water, heating the solution after neutralization and then subjecting the solution to filtration to remove insoluble fraction. Favorable results are obtained by addition of ribonucleic acid (abbreviated as RNA hereinafter) or ribonuclease core (a fraction resistant to pancreas RN-ase when pancreas ribonuclease is applied to ribonucleic acid; abbreviated as RNC hereinafter). The oxaloacetic acid may be used in the free form after neutralization or in the form of alkali metal salts such as sodium or potassium. The optimum quantity to be added depends upon the culture media and the quantity of the RNA or RNC contained therein. For example, when the meat infusion broth is employed, addition of 0.5 percent (weight by volume) of RNA and 0.1 percent (weight by volume) of oxaloacetic acid are preferable. In place of the oxaloacetic acid, salts thereof may be used in an amount of 0.1 percent as free acid. If a yeast extract medium is employed, no further addition of RNA or RNC is necessary, because a large amount of RNA is already present in the yeast extract medium and addition of only 0.2 percent or more (weight) of oxaloacetic acid or salts thereof is enough. It is preferable to maintain the pH value between 7.0 and 7.5.

The cultivation is preferably effected by the stationary cultivation method. The temperature employed is that in the ranges conventionally employed and particularly preferable at around 37° C. The time for the cultivation depends on the medium employed and the inoculated quantity of the bacteria, and it ordinarily ranges from 14 to 20 hours.

The bacterial cells obtained by the cultivation of the hemolytic streptococci on the medium containing oxaloacetic acid or salts thereof have higher SLS producing ability and higher antitumor activity and they are suitable for the treatments to be employed in the production of antitumor agents, for example, aforementioned penicillin treatment and heat-treatment.

In the present invention, such hemolytic streptococci as *Streptococcus hemolyticus* ATCC 21060 and ATCC 21059 may be used. The hemolytic streptococci are a group of streptococci which form hemolysis ring around colonies when cultured in blood agar medium.

The illustrative embodiment of the present invention are explained by way of the practical examples below.

Percent of additives in culturing media is referred to by "-weight by volume."

EXAMPLE 1

95.5 ml. of the meat infusion broth (500 g. of lean ground beef, 1,000 ml. of distilled water, 10 g. of peptone and 5 g. of NaCl) obtained from a fresh beef (sterilized intermittently, pH 7.22) was admixed with 7 ml. of a 1 percent oxaloacetic acid sterilized by passing through a milipore filter (neutralized to pH 7.0 with a 10 percent aqueous solution of sodium carbonate) and 3.5 ml. of a 10 percent RNC solution under sterile condition. This is designated as culture medium I. 70 ml. of the ordinary meat infusion broth without addition of oxaloacetic acid and RNC is designated as culture medium II.

To these media I and II were inoculated 0.3 ml. of the incubated broth of *Streptococcus hemolyticus* Su-strain (ATCC No. 21060) precultivated in the meat infusion broth, and culturing was conducted at 37° C. for 20 hours.

| media | turbidity at 610 mμ | pH |
|---|---|---|
| I | 0.52 | 6.9 |
| II | 0.47 | 6.8 |

The cultivated broth was divided into a 20 ml. fraction and a 50 ml. fraction and the former was provided for the antitumor activity test and the latter for the SLS producing ability and another antitumor activity tests.

Antitumor Activity Test (In Vitro Test)

The bacterial cells were collected by centrifugation of 20 ml. of the broth at 3,500 r.p.m. for 20 minutes and washed twice with Dulbecco A medium and dispersed in 2 ml. of Dulbecco A medium. The suspension was diluted successively to 1, 2, 5, 10, and 20 folds and the antitumor activity was determined in each dilution according to the CIR method (see, Motoichi Hatano, Ryusaku Shimizu, Shugyo Morita, and Takayoshi Yamagishi; Medicine and Biology 74, p. 293, 1967). That is, the following samples were prepared with separately prepared Ehrlich mice tumor cell suspension containing $10^7$ cells/ml. and mercuric chloride solution (250 μg./ml.)

1. bacterial suspension (0.20 ml.) + tumor cell suspension (0.20 ml.)
2. mercuric chloride solution (0.20 ml.) + tumor cell suspension (0.20 ml.)
3. tumor cell suspension (0.20 ml.) + Dulbecco A medium (0.20 ml.)
4. bacterial suspension (0.20 ml.) + Dulbecco A medium (0.20 ml.)
5. mercuric chloride solution (0.20 ml.) + Dulbecco A medium (0.20 ml.)

After incubation at 37° C. for 2 hours, these suspensions were diluted to 1 : 10 with Dulbecco A medium The absorbance of the supernatants obtained by centrifugation at 3,500 to 4,000 r.p.m. at 4° C. for 15 minutes was determined at the optical density of 260 m$\mu$ and the Cell-Injuring-Reaction (abbreviated hereinafter as CIR) value was calculated by the following equation:

$$CIR\ (\%) = \frac{a-(c+d)}{b-(c+e)} \times 100$$

wherein $a$, $b$, $c$, $d$ and $e$ are optical densities of the samples 1, 2, 3, 4 and 5.

| Dilutions | X1 | X2 | X5 | X10 | X20 |
|---|---|---|---|---|---|
| Media: | | | | | |
| I | 125 | 95 | 74 | 54 | 45 |
| II | 63 | 34 | 19 | | 19 |

Antitumor Activity Test (In Vitro–In Vivo Test)

Fifty milliliters of the aforementioned incubated broth was centrifuged at 3,500 r.p.m. for 20 minutes and the bacteria were collected and, washed twice with a physiological saline and suspended in 2.5 ml. of the Bernheimer's Basal Medium (hereinafter abbreviated as BBM) (a solution obtained by adding distilled water to maltose, $KH_2PO_4$ and $MgSO_4 \cdot 7H_2O$ adjusted to the pH of 6.8 to 7.0). 1.2 ml. of the suspension was diluted to 5, 10, 20 and 40 folds with BBM and to each 2.5 ml. fractions of these diluted suspensions was added 0.5 ml. of a physiological saline solution of penicillin ($1.6 \times 10^5$ units/ml.). They were incubated at 20° C. for 20 minutes and then at 45° C. for 30 minutes. A suspension of Ehrlich tumor cell in BBM was added to each diluted cocci-suspension and was incubated at 37° C. for 60 minutes. Subsequently 0.5 ml. ($9 \times 10^6$ tumor cells/mouse) of the incubated mixture was injected intraperitoneally to a group of five mice. The ratios of the healthy surviving mice to the tested mice 55 days after injection are shown below.

| Dilutions | X5 | X10 | X20 | X40 |
|---|---|---|---|---|
| Media: | | | | |
| I | 5/5 | 5/5 | 2/5 | 0/5 |
| II | 4/5 | 3/5 | 0/5 | 0/5 |

SLS Producing Ability Test 2.5 ml. of a BBM suspension of the bacterial cells harvested from 50 ml. of the aforementioned broth was prepared. 1 ml. of a 0.2 percent RNC solution in BBM was added to each 1 ml. of the above suspension and the mixture was incubated at 37° C. for 2 hours. The bacterial cells were centrifuged at 3,500 r.p.m. for 20 minutes and the supernatant was diluted stepwise.

To each diluted supernatant was added an equal volume (1 ml.) of a 3 percent (V/V) suspension of the rabbit erythrocytes in the physiological saline and the mixture was incubated at 37° C. for 2 hours. The hemolytic unit (the number of dilution determined at the 50 percent hemolysis) was determined by the conventional method. The SLS producing ability (HU/ml.) was 30700 in I and 10240 in II, respectively.

EXAMPLE 2

Preparation of yeast extract medium: 3 g. of a yeast extract (produced by Ebios Yakuhin Kogyo K.K., Japan) are dissolved in 50 ml. of distilled water, adjusted to pH 7.0 – 7.2 with 10 percent caustic soda solution and heated at 100° C. for 60 minutes. A precipitate produced is filtered off, and pH of the filtrate is readjusted with 10 percent caustic soda solution and, followed by further heating at 100° C. for 30 minutes as well as by filtration. Water is added to the obtained filtrate to bring it to 100 ml. in total, which is divided into sterilized flasks and subjected to steam sterilization at 1 kg./cm.$^2$ for 10 minutes.

Four media of 100 ml. each were prepared based on the 3 percent yeast extract medium mentioned above and having pH 7.0, with or without addition of oxaloacetic acid, i.e., 0, 0.1, 0.2 and 0.4 percent. To this medium each was inoculated 5 ml. of the cultivated broth of *Streptococcus hemolyticus* Su-strain (ATCC 21060) previously precultivated in the meat infusion broth, and then was cultivated at 37° C. for 20 hours.

| concentrations of oxaloacetic acid (%) | turbidity of the incubated broth at 660 m$\mu$ |
|---|---|
| 0 | 0.36 |
| 0.1 | 0.40 |
| 0.2 | 0.46 |
| 0.4 | 0.50 |

The aforementioned cultivated broth were centrifuged and the bacterial cells were washed twice with a physiological saline and subsequently the cells were suspended in each 5 ml. of the BBM and were provided to the following experiments.

Antitumor (In Vitro Test)

The aforementioned bacterial cells suspension in BBM was diluted with BBM to 10 folds and to each 1 milliliter thereof was added 1 ml. of a suspension of the Ehrlich tumor cells in the physiological saline a phosphate buffer solution ($3 \times 10^7$) (pH 7.2) and the mixture was incubated at 37° C. for 90 minutes. 0.1 ml. was taken therefrom and diluted to 20 folds with a cold phosphate buffer solution. One milliliter of a 0.2 percent aqueous solution of cold trypanblue was added thereto. Immediately thereafter the number of dyed cells and that of the undyed cells (living cells) were determined.

The in vitro activity was calculated according to the following formulas.

Cellular rate of dyeability, $$Percent = \frac{number\ of\ the\ dyed\ cells}{number\ of\ the\ total\ cells} \times 100$$

The results are shown in the following table.

| concentrations of oxaloacetic acid (%) | cellular rate of dyeability (%) |
|---|---|
| 0 | 33 |
| 0.1 | 35 |
| 0.2 | 50 |
| 0.4 | 75 |

Antitumor Test (In Vivo Test)

To each 2 ml. of the aforementioned bacterial cells suspension in BBM was added 0.4 ml. of the physiological saline of penicillin ($1.6 \times 10^5$ units/ml.) and the mixture was incubated at 37° C. for 20 minutes and then heated at 45° C. for 30 minutes. Thus treated cell suspension was diluted to 10 folds with an aforementioned penicillin solution admixed with BBM in a proportion of 1:5 and was injected to the mice, being received intraperitoneal inoculation of $10^6$ Ehrlich tumor cells 24 hours before, intraperitoneally in the amount of 0.1 ml. per mouse daily over a period of 4 days. A group or 10 mice each was used. The results 23 days after inoculation of the tumor cells are shown in the table below.

| dilutions | X10 |
|---|---|
| oxaloacetic acid 0% | 5/10 |
| oxaloacetic acid 0.2% | 8/10 |

SLS Producing Ability Test

To 1 ml. each of a suspension of the aforementioned bacterial cells in BBM was added 1 ml. of a 8 percent solution of RNA in BBM and the admixture was incubated at 37° C. for 2 hours. The hemolytic activity of the supernatant separated was determined in the same manner as above. The results are shown in the following table.

| concentrations of oxaloacetic acid | SLS producing ability (HU/ml.) |
|---|---|
| 0 | 1,700 |
| 0.1 | 4,290 |
| 0.2 | 4,670 |
| 0.4 | 6,720 |

What is claimed is:

1. In a process for cultivating hemolytic streptococci using a nutrient medium containing RNA, RNC or water-soluble yeast extract, the improvement which comprises using oxaloacetic acid or a salt thereof with said RNA, RNC or water-soluble yeast extract in said nutrient medium.

2. A process according to claim 1, wherein the salt of oxaloacetic acid is a sodium or potassium salt thereof.

3. A process according to claim 1, wherein the cultivation is carried out at about 37° C. for 14 to 20 hours.

4. A process according to claim 1, wherein, when the medium is meat infusion broth, 0.5 (w/v) percent of said RNA and 0.1 (w/v) percent of said oxaloacetic acid or salts thereof are used.

5. A process according to claim 1, wherein, when the medium is the medium of an extract containing water-soluble components in a yeast autolysate as a major component, 0.2 (w/v) percent or more of said oxaloacetic acid or salts thereof are used.

* * * * *